(12) United States Patent
Yanagita et al.

(10) Patent No.: US 8,247,115 B2
(45) Date of Patent: Aug. 21, 2012

(54) WOUND-TYPE ELECTRIC STORAGE DEVICE INCLUDING ELECTRODE SHEETS

(75) Inventors: Hideo Yanagita, Tokyo (JP); Kunio Nakazato, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 268 days.

(21) Appl. No.: 12/708,312

(22) Filed: Feb. 18, 2010

(65) Prior Publication Data

US 2010/0221587 A1 Sep. 2, 2010

(30) Foreign Application Priority Data

Feb. 27, 2009 (JP) .................................. 2009-046468

(51) Int. Cl.
*H01M 4/74* (2006.01)

(52) U.S. Cl. ......................... 429/243; 429/233; 429/122
(58) Field of Classification Search .................. 429/233, 429/243, 122

See application file for complete search history.

(56) References Cited

U.S. PATENT DOCUMENTS

| 5,478,668 | A  | * | 12/1995 | Gozdz et al. | .................. | 429/127 |
| 6,461,769 | B1 | * | 10/2002 | Ando et al. | .............. | 429/231.95 |
| 2008/0299455 | A1 | * | 12/2008 | Shiozaki et al. | .............. | 429/209 |

FOREIGN PATENT DOCUMENTS

JP 2006-156330 A 6/2006

* cited by examiner

*Primary Examiner* — Barbara Gilliam
*Assistant Examiner* — Zachary Best
(74) *Attorney, Agent, or Firm* — McDermott Will & Emery LLP

(57) ABSTRACT

A positive electrode sheet including a positive electrode mixture layer formed on one surface is provided at one of the outermost layers of an electrode sheet group, while a positive electrode sheet including a positive electrode mixture layer formed at one surface is provided at the other outermost layer of the electrode sheet group. A negative electrode sheet including negative electrode mixture layers formed on both surfaces is provided between the positive electrode sheets. A lithium electrode sheet including metal lithium foils formed on both surfaces is overlapped onto the electrode sheet group formed by stacking the three sheets. When a wound-type electric storage device is produced, the electrode sheet group is wound together with the lithium electrode sheet.

5 Claims, 9 Drawing Sheets

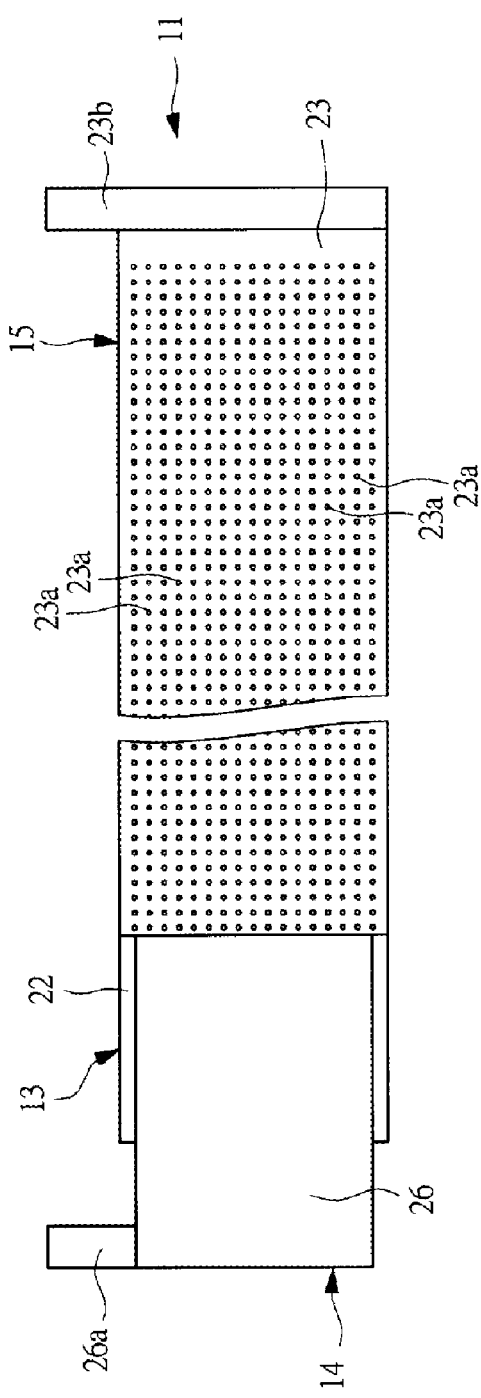
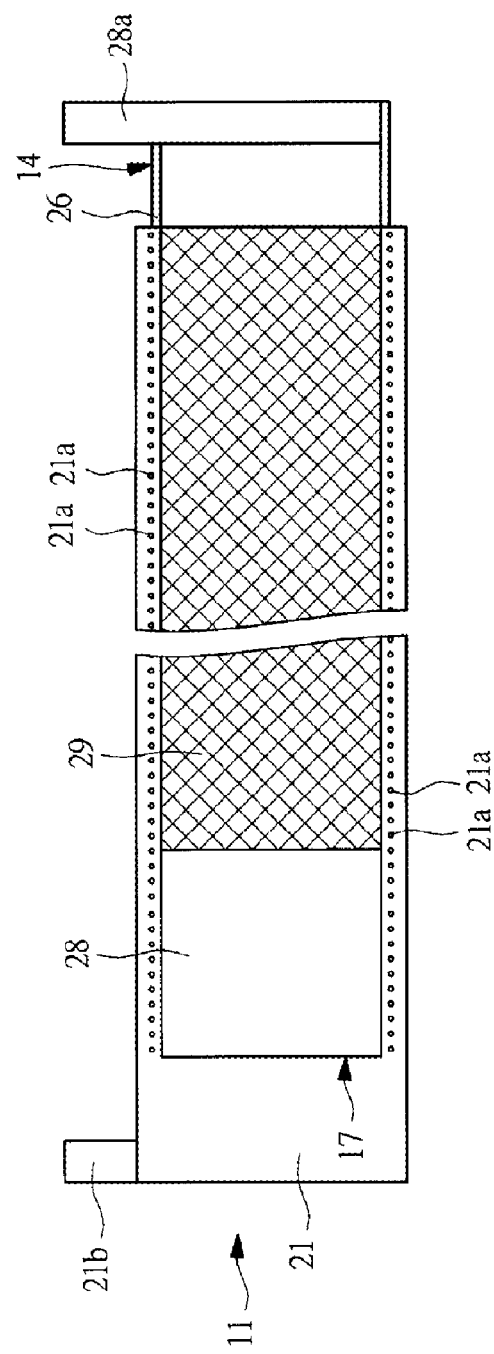

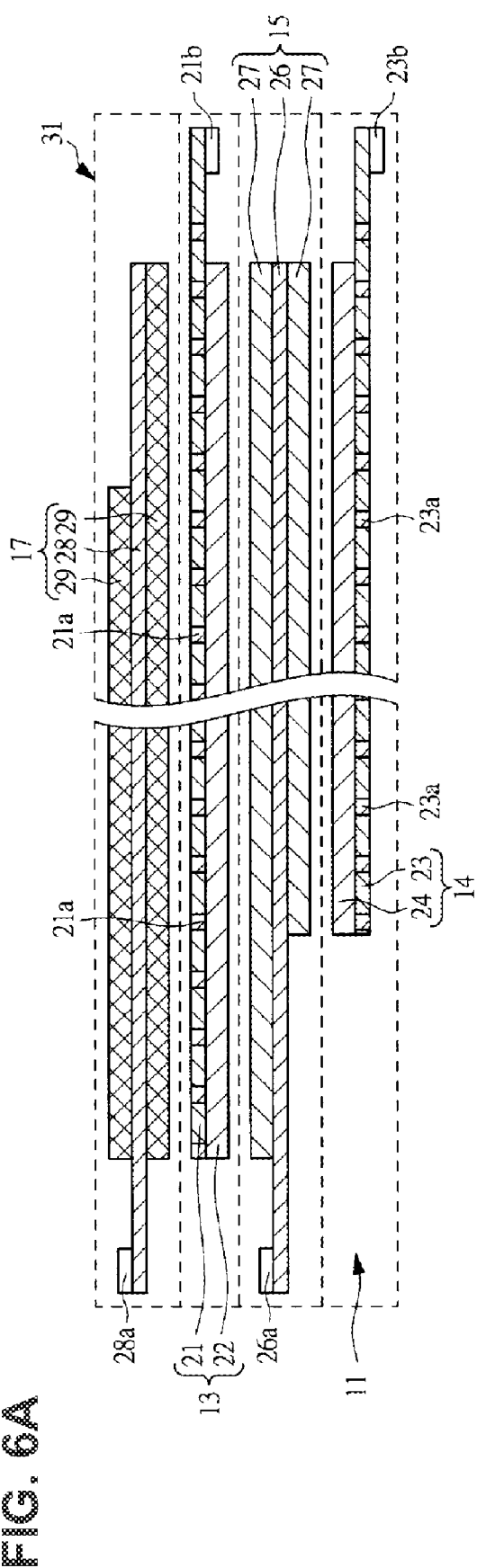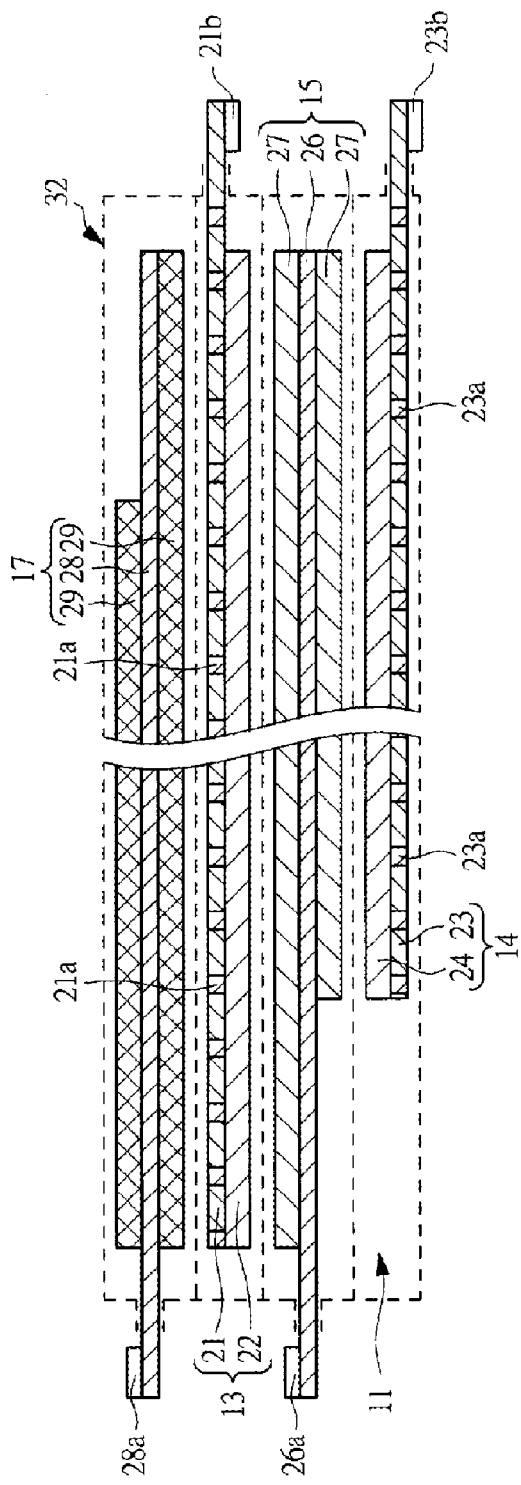

WOUND-TYPE ELECTRIC STORAGE DEVICE INCLUDING ELECTRODE SHEETS

CROSS-REFERENCE TO RELATED APPLICATIONS

The present application claims priority from Japanese Patent Application No. 2009-046468 filed on Feb. 27, 2009, and is hereby incorporated by reference in its entirety

BACKGROUND OF THE INVENTION

1. Field of the Invention

The present invention relates to a wound-type electric storage device including an electrode sheet group that is wound to be accommodated in a casing.

2. Description of Related Art

There are a lithium ion capacitor and a lithium ion secondary battery as an electric storage device used for an electric vehicle or an electric apparatus. As one type of the electric storage device described above, a wound-type electric storage device has been proposed in which a positive electrode sheet and a negative electrode sheet are wound as stacked (see, for example, Japanese Patent Application Laid-Open (JP-A) No. 2006-156330). In the electric storage device disclosed in JP-A No. 2006-156330, a metal lithium is adhered onto the negative electrode. Since the metal lithium is incorporated into the electric storage device, lithium ions can be doped from the metal lithium into the negative electrode. Thus, the energy density of the electric storage device can be enhanced.

SUMMARY OF THE INVENTION

In the electric storage device disclosed in JP-A No. 2006-156330, the metal lithium is partially adhered onto the negative electrode. However, the partial arrangement of the metal lithium causes the variation in the doping amount in the electrode surface. The local doping of the lithium ions described above lowers the doping speed, thereby increasing the doping time. The local doping of the lithium ions also causes the variation in the potential of the negative electrode, which deteriorates the quality of the electric storage device.

The present invention aims to uniformly dope ions into an electrode.

A wound-type electric storage device according to the present invention includes an electrode sheet group, which is formed by stacking a plurality of electrode sheets, and is accommodated in a casing as wound, wherein one of a positive electrode and a negative electrode has a first electrode sheet that is provided at one of the outermost layers of the electrode sheet group, and includes a first electrode current collector and a first electrode mixture layer applied onto one surface of the first electrode current collector, and a second electrode sheet that is formed at the other outermost layer of the electrode sheet group and has a second electrode current collector and a second electrode mixture layer applied onto one surface of the second electrode current collector, and the other one of the positive electrode and the negative electrode has a third electrode sheet that is formed between the first electrode sheet and the second electrode sheet and includes a third electrode current collector and a third electrode mixture layer applied onto both surfaces of the third electrode current collector, wherein an ion source sheet for supplying ions to at least one of the first electrode mixture layer, the second electrode mixture layer, and the third electrode mixture layer is overlapped on the electrode sheet group, and the electrode sheet group is wound together with the ion source sheet, in order that one surface of the ion source sheet is faced to the first electrode sheet while the other surface of the ion source sheet is faced to the second electrode sheet.

In the wound-type electric storage device according to the present invention, the first electrode current collector and the second electrode current collector are formed with a plurality of through-holes.

In the wound-type electric storage device, the third electrode current collector is not formed with through-holes.

In the wound-type electric storage device, the first electrode mixture layer and the second electrode mixture layer are applied at the side of the third electrode sheet.

In the wound-type electric storage device, the ion source sheet includes a lithium electrode current collector connected to at least any one of the electrode current collectors, and metal lithium provided on both surfaces of the lithium electrode current collector.

In the wound-type electric storage device, the first electrode sheet and the second electrode sheet are given a function as the positive electrode.

In the present invention, the ion source sheet is overlapped on the electrode sheet group, and the electrode sheet group is wound together with the ion source sheet. With this configuration, the gap between the electrode mixture layer and the ion source sheet can be made constant, whereby the ions can uniformly be doped into the electrode mixture layer. Since the ions are uniformly doped, the local potential decrease can be prevented, whereby the reduction in the pre-doping speed can be suppressed.

BRIEF DESCRIPTION OF THE DRAWINGS

FIG. 3A is a front view illustrating the electrode sheet group in the direction indicated by an arrow A in FIG. 2; FIG. 3B is a back view illustrating the electrode sheet group in the direction indicated by an arrow B in FIG. 2;

FIGS. 6A and 6B are explanatory views illustrating the structure in which the electrode sheet group and the lithium electrode sheet are collected together as one unit;

DETAILED DESCRIPTION OF THE PREFERRED EMBODIMENTS

Figure 1:
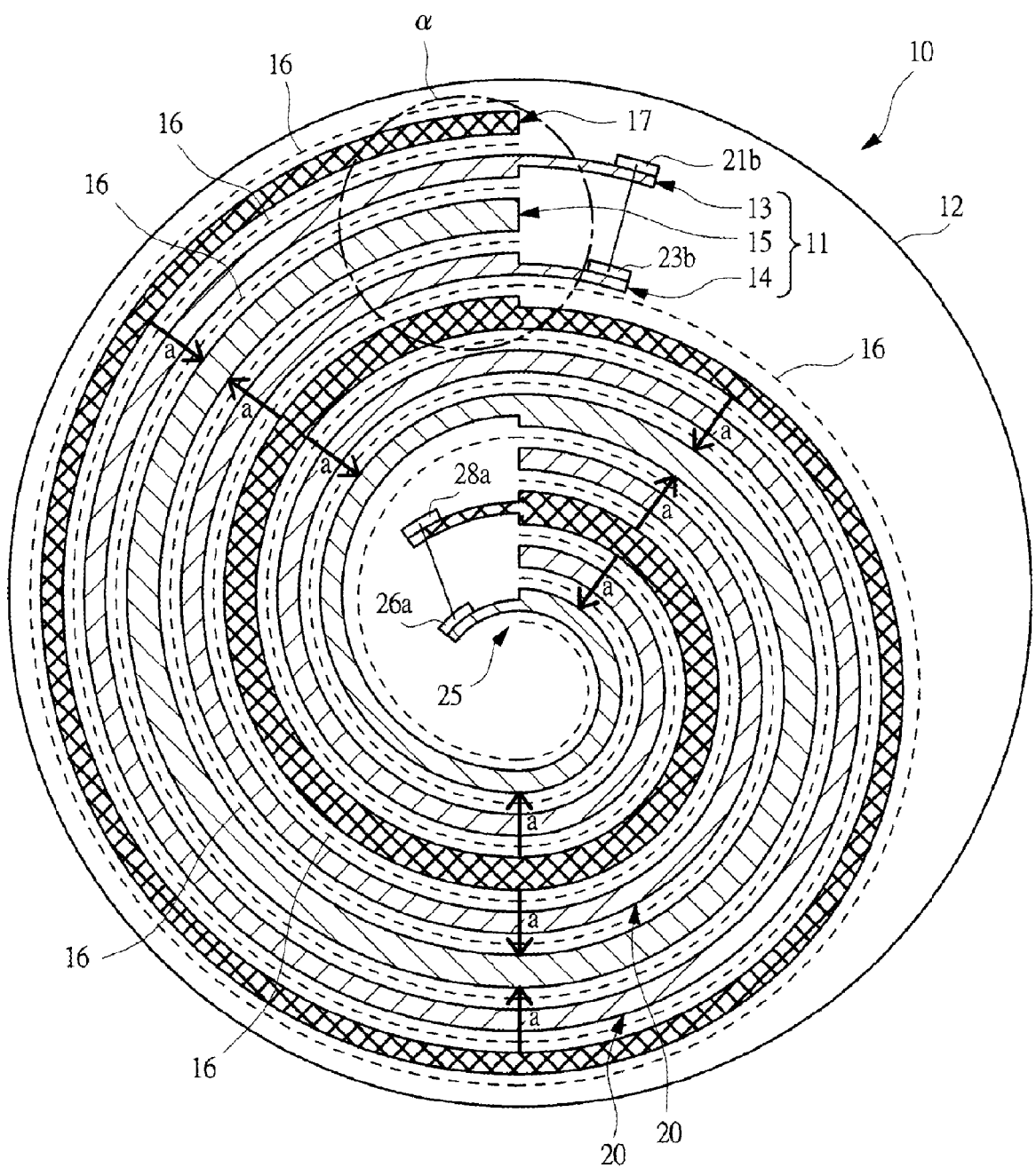
FIG. 1 is a sectional view schematically illustrating a wound-type electric storage device according to one embodiment of the present invention.
Figure 2:
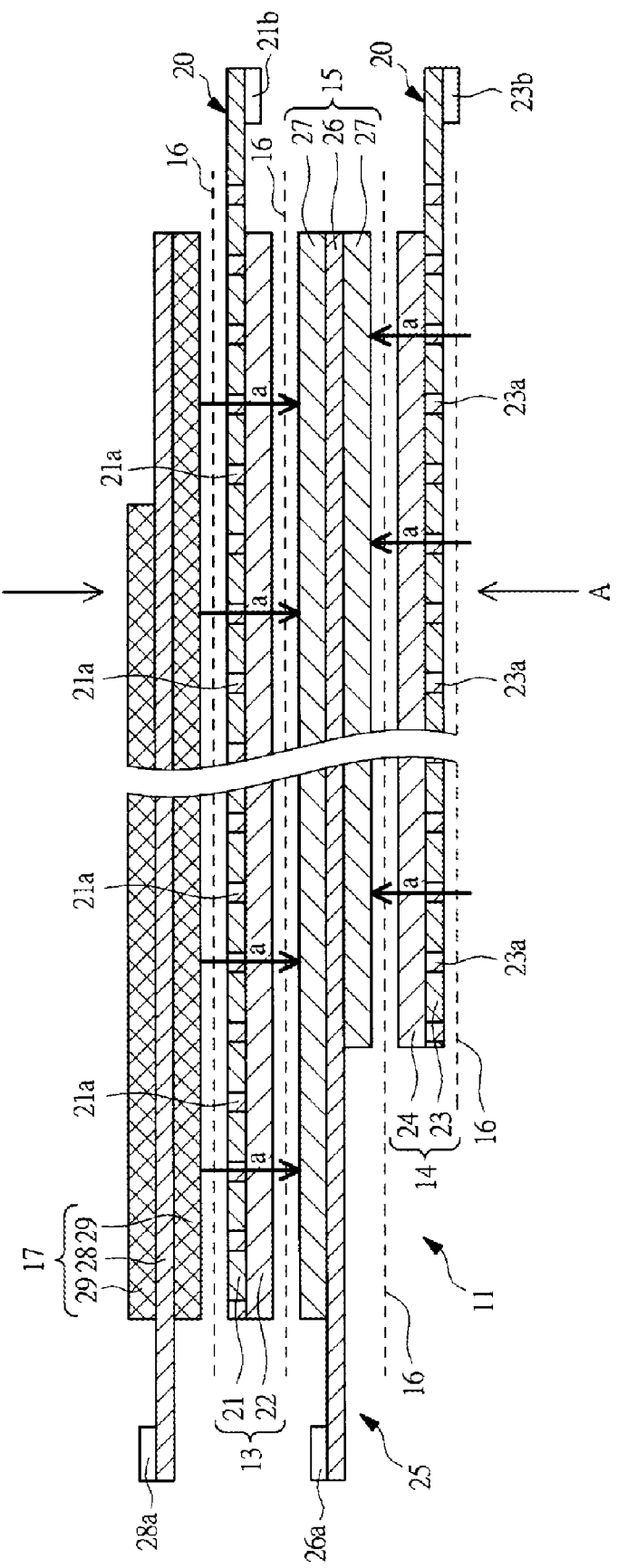
FIG. 2 is a sectional view schematically illustrating an electrode sheet group accommodated in the electric storage device.

FIG. 1 is a sectional view schematically illustrating a wound-type electric storage device 10 according to one embodiment of the present invention. FIG. 2 is a sectional view schematically illustrating an electrode sheet group 11 accommodated in the electric storage device 10. The electrode sheet group 11 illustrated in FIG. 2 is an electrode sheet group that has not yet been wound. As illustrated in FIG. 1, the long electrode sheet group 11 is accommodated, as wound, in a casing 12 of the electric storage device 10. The electrode sheet group 11 is composed of positive electrode sheets 13 and 14 and a negative electrode sheet 15 that are stacked alternately as illustrated in FIG. 2. A lithium electrode sheet (ion source sheet) 17 is overlapped on the electrode sheet group 11. Separators 16 are formed between the lithium electrode sheet 17 and the positive electrode sheet 13, between the positive electrode sheet 13 and the negative electrode sheet 15, and between the negative electrode sheet 15 and the positive electrode sheet 14 respectively. When the electrode sheet group 11 and the lithium electrode sheet 17 are wound from the left end in FIG. 2, the electrode sheet group 11 and the lithium electrode sheet 17 become the configuration illustrated in FIG. 1.

As illustrated in FIG. 2, a positive electrode sheet (first electrode sheet) 13 constituting the positive electrode 20 is formed at one of the outermost layers of the electrode sheet group 11. The positive electrode sheet 13 includes a positive electrode current collector (first electrode current collector) 21 formed with a large number of through-holes 21a, and a positive electrode mixture layer (first electrode mixture layer) 22 applied on one surface of the positive electrode current collector 21. A positive electrode sheet (second electrode sheet) 14 constituting the positive electrode 20 is provided at the other outermost layer of the electrode sheet group 11. The positive electrode sheet 14 includes a positive electrode current collector (second electrode current collector) 23 formed with a large number of through-holes 23a, and a positive electrode mixture layer (second electrode mixture layer) 24 applied on one surface of the positive electrode current collector 23. A negative electrode sheet (third electrode sheet) 15 constituting the negative electrode 25 is provided between the positive electrode sheets 13 and 14. The negative electrode sheet 15 includes a negative electrode current collector (third electrode current collector) 26, and negative electrode mixture layers (third electrode mixture layer) 27 applied on both surfaces of the negative electrode current collector 26. The lithium electrode sheet 17 overlapped on the electrode sheet group 11 includes a lithium electrode current collector 28 and metal lithium foils (metal lithium) 29 provided on both surfaces of the lithium electrode current collector 28.

The positive electrode mixture layers 22 and 24 of the positive electrode sheets 13 and 14 are applied at the side of the negative electrode sheet 15. With this configuration, the positive electrode mixture layers 22 and 24 and the negative electrode mixture layers 27 respectively oppose to each other across the corresponding separator 16. As illustrated in FIG. 2, the positive electrode mixture layer 24 of the positive electrode sheet 14 is set shorter than the positive electrode mixture layer 22 of the positive electrode sheet 13. The negative electrode mixture layers 27 provided on both surfaces of the negative electrode sheet 15 are formed to have a different length. The metal lithium foils 29 provided on both surfaces of the lithium electrode sheet 17 are formed to have a different length. Specifically, the lengths of the positive electrode mixture layers 22 and 24, the negative electrode mixture layers 27, and the metal lithium foils 29 are adjusted such that, when the electrode sheet group 11 and the lithium electrode sheet 17 are wound, the positive electrode mixture layers 22 and 24 always oppose to the negative electrode mixture layers 27, as well as the metal lithium foils 29 are always overlapped on the mixture layers 22, 24, and 27, as illustrated in FIG. 1.

FIG. 3(A) is a front view illustrating the electrode sheet group 11 in the direction indicated by an arrow A in FIG. 2. FIG. 3(B) is a back view illustrating the electrode sheet group 11 in the direction indicated by an arrow B in FIG. 2. The separators 16 in the electrode sheet group 11 are not illustrated in FIG. 3. As illustrated in FIGS. 2 and 3, terminal welding parts 21b and 23b extending in the widthwise direction are provided at one end of the positive electrode current collectors 21 and 23. These terminal welding parts 21b and 23b are bonded as overlapped with each other, and a positive electrode terminal not illustrated is bonded to the terminal welding parts 21b and 23b. One end of the negative electrode current collector 26 is provided with a terminal welding part 26a extending in the widthwise direction. A negative electrode terminal not illustrated is bonded to the terminal welding part 26a. One end of the lithium electrode current collector 28 is provided with a terminal welding part 28a extending in the widthwise direction. The terminal welding part 28a of the lithium electrode current collector 28 is bonded to the terminal welding part 26a of the negative electrode current collector 26. As illustrated in FIGS. 3A and 3B, the width of the sheets 13 to 15 and 17 is set such that the width becomes smaller in the order of the negative electrode sheet 15, the positive electrode sheets 13 and 14, and the lithium electrode sheet 17.

The positive electrode mixture layers 22 and 24 of the positive electrode sheets 13 and 14 contain an activated carbon as a positive electrode active material. The activated carbon allows lithium ions or anions to be reversibly doped thereinto and de-doped therefrom. The negative electrode mixture layer 27 of the negative electrode sheet 15 contains a polyacene-based organic semiconductor (PAS) as a negative electrode active material. The PAS allows lithium ions to be reversibly doped thereinto and de-doped therefrom. Since the activated carbon is employed as the positive electrode active material and the PAS is employed as the negative electrode active material, the electric storage device 10 can function as a lithium ion capacitor. The electric storage device to which the present invention is applied may be a lithium ion battery or an electric double layer capacitor, or other types of battery or capacitor. In the specification of the present invention, the term doping (dope) involves storage, support, adsorb or insert. Specifically, the dope means a phenomenon where lithium ions enter the positive electrode active material or the negative electrode active material. The term de-doping (de-dope) involves release and desorb. Specifically, the de-dope means a phenomenon where lithium ions desorb from the positive electrode active material or the negative electrode active material.

As described above, the lithium electrode sheet 17 is accommodated together with the electrode sheet group 11 in the casing 12 of the electric storage device 10. Further, the terminal welding part 28a of the lithium electrode current collector 28 and the terminal welding part 26a of the negative electrode current collector 26 are bonded to each other. Thus, the negative electrode sheet 15 and the lithium electrode sheet 17 accommodated in the casing 12 are electrically connected to each other. Accordingly, when electrolyte solution is injected into the casing 12 during the manufacturing process, the lithium ions start to be doped (hereinafter referred to as pre-dope) into the negative electrode sheet 15 from the lithium electrode sheet 17. The potential of the negative electrode can be lowered by pre-doping the lithium ions into the negative electrode sheet 15 as described above, whereby the cell voltage of the electric storage device 10 can be enhanced. The positive electrode sheets 13 and 14 can deeply be discharged due to the lowered potential of the negative electrode, whereby the cell capacity (discharge capacity) of the electric storage device 10 can be enhanced. The capacitance of the negative electrode sheet 15 can be increased by the pre-dope. Therefore, the capacitance of the electric storage device 10 can be enhanced. Since the cell voltage, the cell capacity, and the capacitance of the electric storage device 10 can be enhanced as described above, the energy density of the electric storage device 10 can be increased. From the viewpoint of increasing the capacity of the electric storage device 10, the amount of the metal lithium foil 29 is preferably set such that the potential of the positive electrode after the positive electrode and the negative electrode are short-circuited becomes 2.0 V (vs. Li/Li+) or lower.

Figure 4:
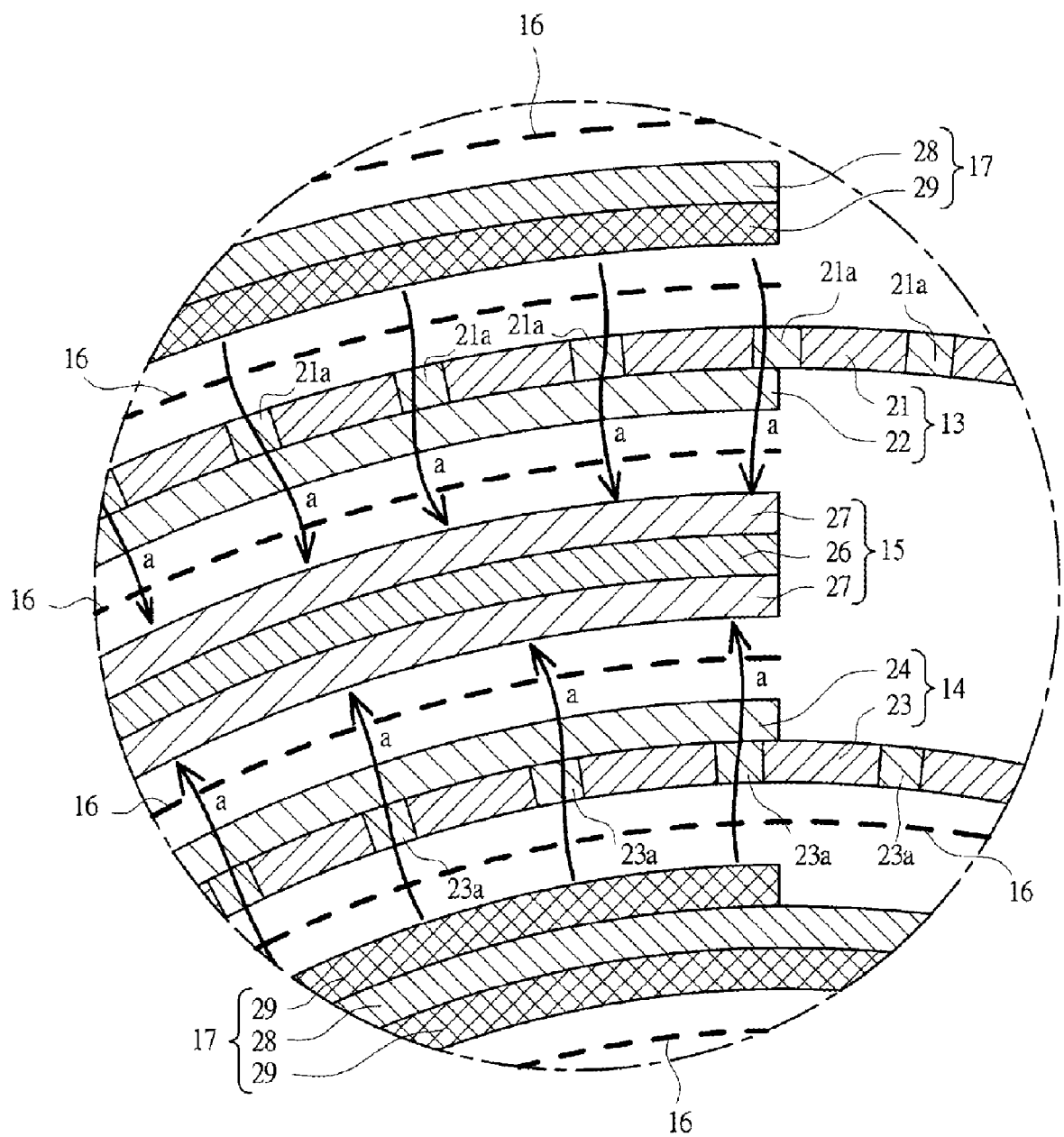
FIG. 4 is a sectional view illustrating the range α in FIG. 1 as enlarged.

During the pre-dope described above, the lithium ions move in the stacking direction from the metal lithium foil 29 of the lithium electrode sheet 17 toward the negative electrode mixture layer 27 of the negative electrode sheet 15 as indicated by an arrow a in FIG. 1. FIG. 4 is a sectional view illustrating the range α in FIG. 1 as enlarged. In order to easily understand the present invention, gaps are illustrated among the positive electrode sheets 13 and 14, the negative electrode sheet 15, the lithium electrode sheet 17, and the separators 16 in FIG. 4. However, in the real electric storage device 10, it is needless to say that the positive electrode sheets 13 and 14, the negative electrode sheet 15, the lithium electrode sheet 17, and the separators 16 are brought into intimate contact with each other. The positive electrode sheets 13 and 14 are arranged on the moving path of the lithium ions upon the pre-dope as illustrated in FIG. 4, while the positive electrode current collectors 21 and 23 are formed with through-holes 21a and 23a through which ions pass. Therefore, the lithium ions released from the metal lithium foil 29 can move in the stacking direction toward the negative electrode sheet 15 as indicated by the arrow a in FIG. 4. Thus, the lithium ions can smoothly be pre-doped into the negative electrode sheet 15 sandwiched between the positive electrode sheets 13 and 14.

When the lithium electrode sheet 17 is wound together with the electrode sheet group 11, one surface of the lithium electrode sheet 17 becomes faced to the positive electrode sheet 13, while the other surface of the lithium electrode sheet 17 becomes faced to the positive electrode sheet 14, as illustrated in FIG. 1. Specifically, since the lithium electrode sheet 17 is arranged so as to hold the negative electrode sheet 15, the gap between the negative electrode sheet 15 and the lithium electrode sheet 17 becomes generally constant all over the negative electrode sheet 15 as illustrated in FIG. 1. Accordingly, the moving resistance of the lithium ions, which move from the metal lithium foil 29 to the negative electrode mixture layer 27, becomes substantially constant, whereby the lithium ions can uniformly be pre-doped into the negative electrode mixture layer 27. Accordingly, the variation in the potential at each part of the negative electrode sheet 15 is suppressed, so that a local overcharge or overdischarge upon the charging/discharging can be prevented. Since the local overcharge or overdischarge is prevented, the performance of the electric storage device 10 can be enhanced, and the quality thereof can be stabilized. Since the lithium ions are evenly pre-doped into the negative electrode mixture layer 27, the local potential decrease of the negative electrode mixture layer 27 during the pre-dope can be prevented, whereby the reduction in the pre-doping speed can be suppressed. Since the reduction in the pre-doping speed is suppressed, the pre-doping time can be shortened.

In the description above, the through-holes 21a and 23a are formed on the positive electrode current collectors 21 and 23, but the through-holes are not formed on the negative electrode current collector 26 and the lithium electrode current collector 28. As described above, the through-holes are formed only on the portions needed for the pre-dope. Therefore, the processing cost of the through-holes and the applying cost of the electrode mixture layer can be reduced, whereby the production cost of the electric storage device can be reduced. Although the through-holes may be formed on the negative electrode current collector 26 or the lithium electrode current collector 28, it is desirable not to form the through-holes from the viewpoint of the production cost.

In the above description, the positive electrode 20 is composed of two positive electrode sheets 13 and 14, and the negative electrode 25 is composed of one negative electrode sheet 15. However, the present invention is not limited thereto. The negative electrode may be composed of two negative electrode sheets (first electrode sheet, second electrode sheet), and the positive electrode may be composed of one positive electrode sheet (third electrode sheet) arranged between the negative electrode sheets. In this case, a large number of through-holes are formed on the negative electrode current collector (first electrode current collector, second electrode current collector) of the negative electrode sheet, and the negative electrode mixture layer (first electrode mixture layer, second electrode mixture layer) is applied on one surface of the negative electrode current collectors. The positive electrode mixture layers (third electrode mixture layer) are applied on both surfaces of the positive electrode current collector (third electrode current collector) of the positive electrode sheet. The negative electrode sheet having the negative electrode mixture layer applied on one surface is arranged at the outermost layers of the electrode sheet group, while the positive electrode sheet having the positive electrode mixture layers applied on both surfaces is arranged between the negative electrode sheets. In this case, it is desirable that the through-holes are not formed on the positive electrode current collector of the positive electrode sheet from the viewpoint of the production cost.

Figure 5:
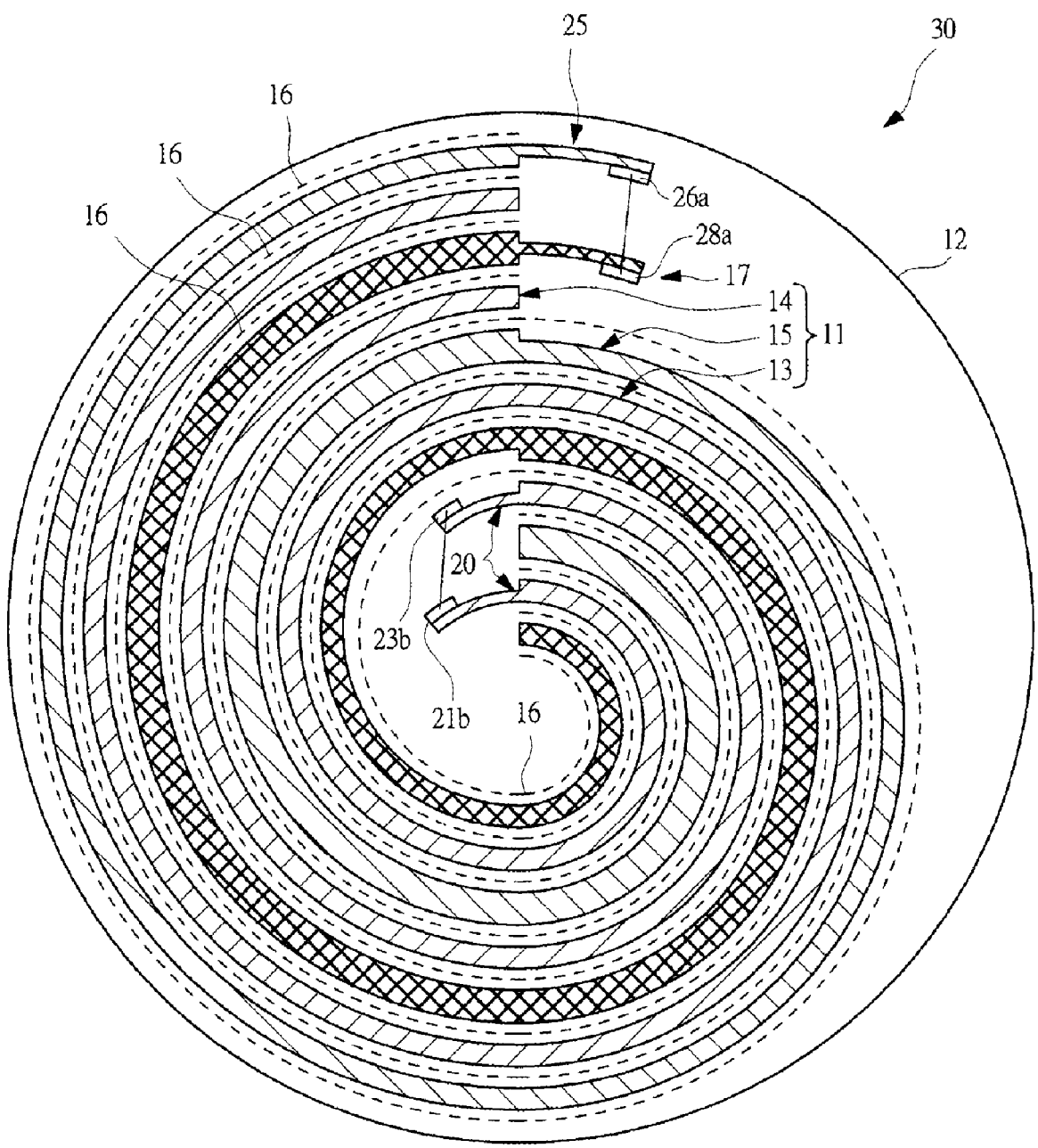
FIG. 5 is a sectional view schematically illustrating a wound-type electric storage device having an electrode sheet group and a lithium electrode sheet wound from the right end of FIG. 2.

In the above description, the electrode sheet group 11 and the lithium electrode sheet 17 are wound from the left end of FIG. 2. However, the present invention is not limited thereto. The electrode sheet group 11 and the lithium electrode sheet 17 may be wound from the right end of FIG. 2. FIG. 5 is a sectional view schematically illustrating a wound-type electric storage device 30 having the electrode sheet group 11 and the lithium electrode sheet 17 wound from the right end of FIG. 2. As illustrated in FIG. 5, since the electrode sheet group 11 and the lithium electrode sheet 17 are wound from the right end of FIG. 2, the negative electrode sheet 15 is arranged at the outer periphery of the electric storage device 30, while the lithium electrode sheet 17 is arranged at the center of the electric storage device 30. Even in the electric storage device 30 having the wound structure described above, the negative electrode sheet 15 is sandwiched between the lithium electrode sheets 17, whereby the effect same as that of the above-mentioned electric storage device 10 can be obtained.

While each of the sheets 13 to 15, and 17 are merely stacked in FIG. 2, the electrode sheet group 11 and the lithium electrode sheet 17 may be collected as one unit by the separator. FIGS. 6A and 6B are explanatory views illustrating the structure in which the electrode sheet group 11 and the lithium electrode sheet 17 are collected together as one unit. As illustrated in FIGS. 6A and 6B, the electrode sheet group 11 and the lithium electrode sheet 17 are accommodated in bag-like separators 31 and 32. With this structure, the electrode sheet group 11 and the lithium electrode sheet 17 are collected together as one unit. When the electrode sheet group 11 and the lithium electrode sheet 17 are collected together as one unit, the electrode sheet group 11 and the lithium electrode sheet 17 are very easy to handle during the manufacture. A plurality of accommodating sections may be formed beforehand in the separators 31 and 32, and each of the sheets 13 to 15 and 17 may be accommodated in these accommodating sections. The outer periphery of the electrode sheet group 11 and the lithium electrode sheet 17 may be wound by the separators, and the end portion thereof may be sealed, whereby the separators 31 and 32 may be formed into a bag. Further, as illustrated in FIG. 6A, the terminal welding parts 21b, 23b, 26a, and 28a may be enclosed by the separator 31, while the separator 32 may enclose only the portion other than the terminal welding parts 21b, 23b, 26a, and 28a as illustrated in FIG. 6B.

Figure 7:
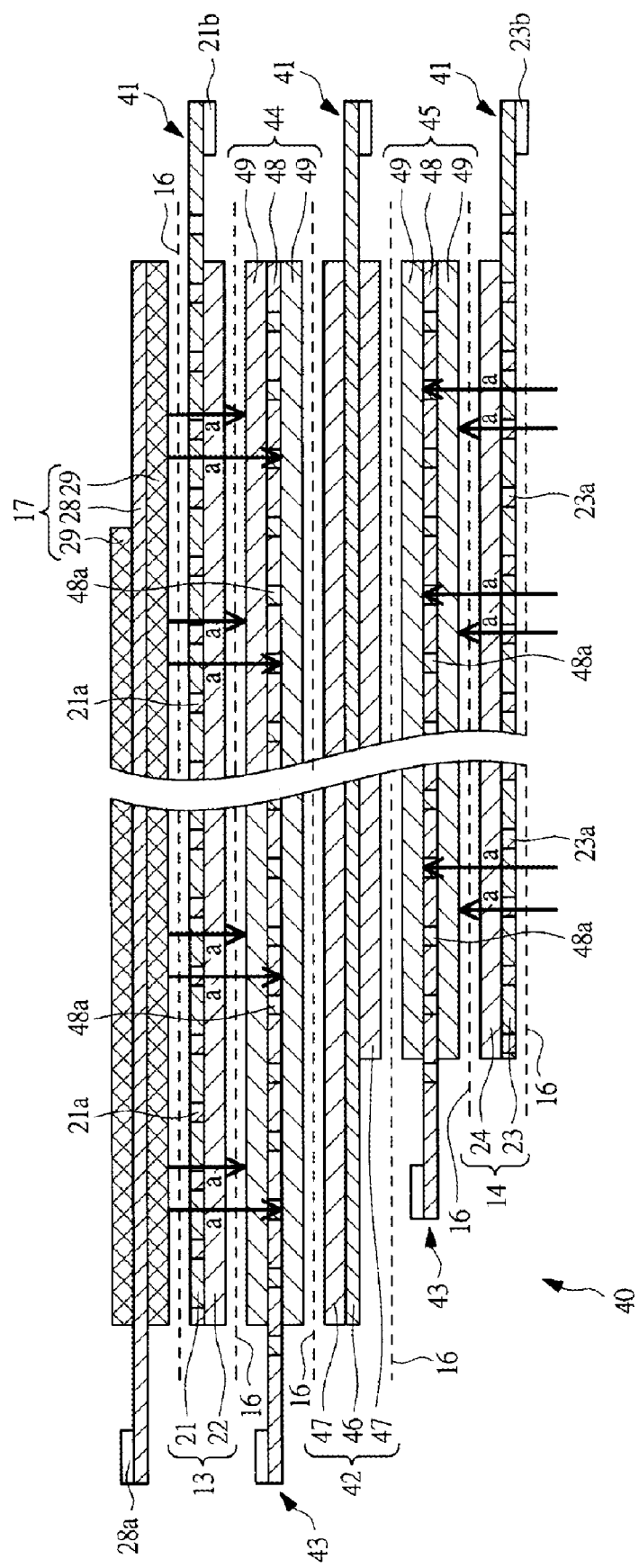
FIG. 7 is a sectional view schematically illustrating an electrode sheet group of a wound-type electric storage device according to another embodiment of the present invention.
Figure 8:
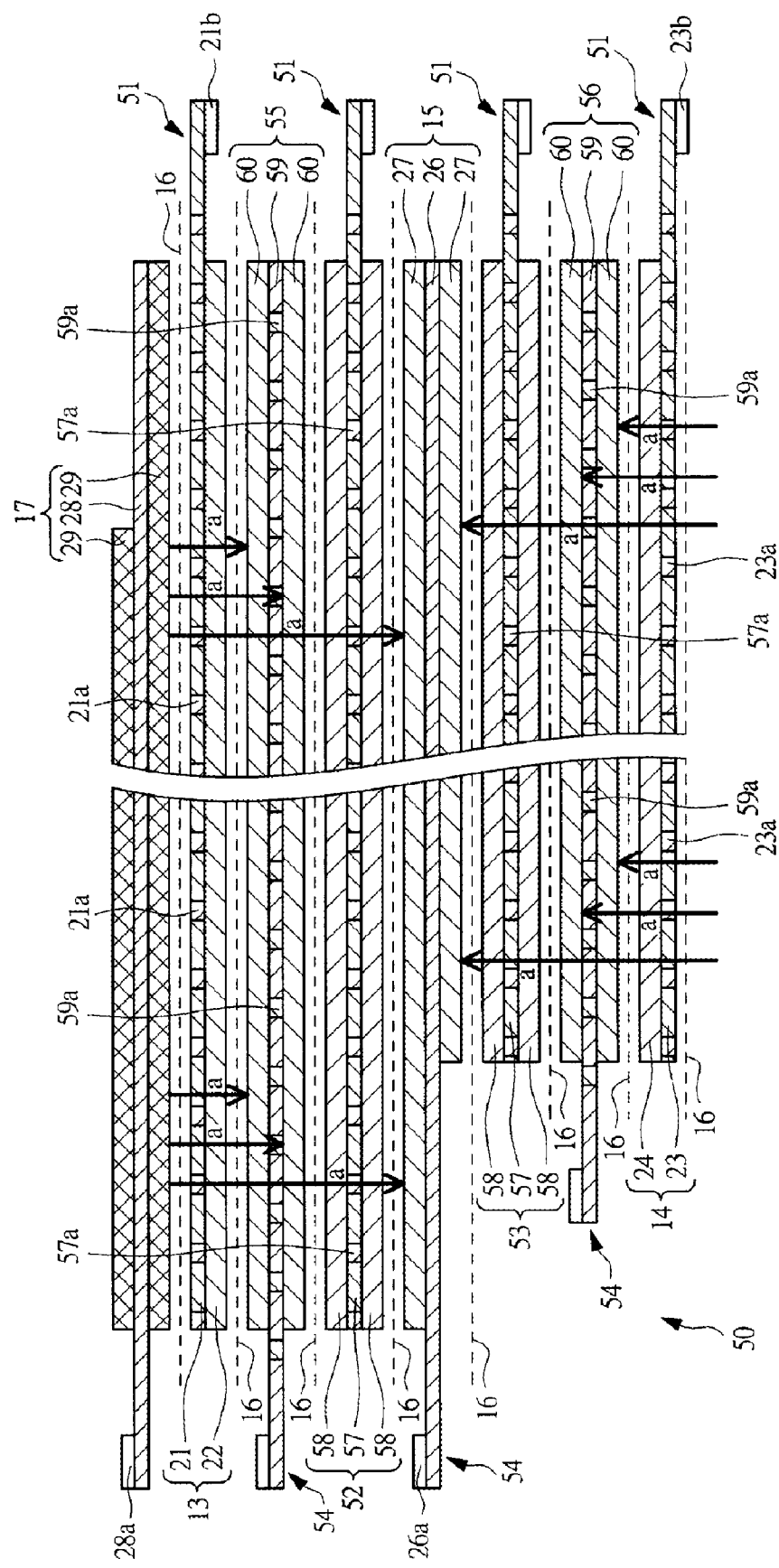
FIG. 8 is a sectional view schematically illustrating an electrode sheet group of a wound-type electric storage device according to another embodiment of the present invention.

In the above description, the electrode sheet group 11 is composed of two positive electrode sheets 13 and 14, and one negative electrode sheet 15 as illustrated in FIG. 2. However, the present invention is not limited thereto. The number of the positive electrode and the negative electrode constituting the electrode sheet group 11 may be changed. FIGS. 7 and 8 are sectional views schematically illustrating electrode sheet groups 40 and 50 of a wound-type electric storage device according to other embodiments of the present invention. Like FIG. 2, FIGS. 7 and 8 show the electrode sheet groups 40 and 50 that have not yet been wound. The members in FIGS. 7 and 8 same as those in FIG. 2 are identified by the same numerals, and the description will not be repeated.

As illustrated in FIG. 7, the electrode sheet group 40 includes three positive electrode sheets 13, 14, and 42, which constitute a positive electrode 41, and two negative electrode sheets 44 and 45, which constitute a negative electrode 43. The positive electrode sheet 13 is provided at one of the outermost layers of the electrode sheet group 40, while the positive electrode sheet 14 is provided at the other outermost layer. The positive electrode sheet 42 is provided at the central layer of the electrode sheet group 11. The positive electrode sheet 42 includes a positive electrode current collector 46, and positive electrode mixture layers 47 applied on both surfaces of the positive electrode current collector 46. The negative electrode sheet 44 is provided between the positive electrode sheets 13 and 42, while the negative electrode sheet 45 is provided between the positive electrode sheets 14 and 42. These negative electrode sheets 44 and 45 include a negative electrode current collector 48 formed with a plurality of through-holes 48a, and negative electrode mixture layers 49 applied on both surfaces of the negative electrode current collector 48. The negative electrode sheets 44 and 45 are provided between the positive electrode sheet 13 and the positive electrode sheet 14, so that either one of the negative electrode sheets 44 and 45 forms a third electrode sheet.

As illustrated in FIG. 8, an electrode sheet group 50 includes four positive electrode sheets 13, 14, 52, and 53 constituting a positive electrode, and three negative electrode sheets 15, 55, and 56 constituting a negative electrode 54. The positive electrode sheet 13 is provided at one of the outermost layers of the electrode sheet group 50, while the positive electrode sheet 14 is provided at the other outermost layer. The positive electrode sheets 52 and 53 are provided between the positive electrode sheets 13 and 14. The positive electrode sheets 52 and 53 arranged between the positive electrode sheets 13 and 14 includes a positive electrode current collector 57 formed with a plurality of through-holes 57a, and positive electrode mixture layers 58 applied on both surfaces of the positive electrode current collector 57. The negative electrode sheet 55 is provided between the positive electrode sheets 13 and 52, while the negative electrode sheet 56 is provided between the positive electrode sheets 14 and 53. These negative electrode sheets 55 and 56 include a negative electrode current collector 59 formed with a plurality of through-holes 59a, and negative electrode mixture layers 60 applied on both surfaces of the negative electrode current collector 59. The negative electrode sheet 15 having the negative electrode mixture layers formed on both surfaces is provided between the positive electrode sheets 52 and 53. The negative electrode sheets 15, 55 and 56 are provided between the positive electrode sheet 13 and the positive electrode sheet 14, so that any one of the negative electrode sheets 15, 55 and 56 forms a third electrode sheet.

Even in the configuration in which the electrode sheet groups 40 and 50 are formed as described above, the gap between the respective negative electrode mixture layers 27, 49 and 60 and the metal lithium foil 29 becomes substantially constant as indicated by an arrow a in FIGS. 7 and 8, when the lithium electrode sheet 17 is wound together with the electrode sheet groups 40 and 50. With this, the lithium ions are uniformly pre-doped in the electrode surfaces of the respective negative electrode mixture layers 27, 49, and 60, like the electric storage device 10 described above. Since the lithium ions are pre-doped from both of the outermost layers of the respective electrode sheet groups 40 and 50 in the wound state as illustrated in FIGS. 7 and 8, the through-holes are not formed on the positive electrode current collector 46 and the negative electrode current collector 26 formed at the center of the electrode sheet groups 40 and 50. Although the through-holes may be formed on the positive electrode current collector 46 or the negative electrode current collector 26 arranged at the center of the electrode sheet groups 40 and 50, it is desirable not to form the through-holes on the current collectors from the viewpoint of reducing cost taken for forming the through-holes. In the electrode sheet groups 40 and 50 illustrated in FIGS. 7 and 8, the positive electrodes 41 and 51 and the negative electrodes 43 and 54 may be replaced with each other. Specifically, the illustrated positive electrode sheets 13, 14, 42, 52, and 53 may be given a function as the negative electrode sheets, while the illustrated negative electrode sheets 15, 44, 45, 55, and 56 may given a function as the positive electrode sheets.

Although the positions of the positive electrodes 20, 41, and 51 and the positions of the negative electrodes 25, 43, and 54 in the electrode sheet groups 11, 40, and 50 illustrated in FIGS. 2, 7, and 8 may be replaced with each other, it is desirable that the positive electrode sheets 13 and 14 are arranged at the outermost layers of the electrode sheet groups 11, 40, and 50 from the viewpoint of the possibility of the deposition of the metal lithium upon the pre-dope. The reason will be described below.

When the positions of the positive electrode and the negative electrode are replaced in the electrode sheet group, the negative electrode sheet having the negative electrode mixture layer formed on its one surface is arranged at the outermost layer of the electrode sheet group. Since the negative electrode mixture layer of the negative electrode sheet is made of a carbon material, the potential of the negative electrode is lowered to the potential substantially equal to the potential of the metal lithium foil upon the pre-dope. The condition in which the negative electrode sheet having the negative electrode mixture layer formed on its one surface and the negative electrode current collector is exposed is arranged, while the potential of the negative electrode is lowered to the potential substantially equal to the potential of the metal lithium foil, causes the deposition of the metal lithium on the exposed surface of the negative electrode current collector. It is considered that the deposition of the metal lithium is generated due to the reduction of the lithium ions present in the vicinity of the exposed surface of the negative electrode current collector.

In order to prevent the deposition of the metal lithium, it is necessary that the negative electrode mixture layer is applied on both surfaces of the negative electrode current collector so as to cover the exposed surface of the negative electrode current collector by the negative electrode mixture layer. However, the arrangement of the negative electrode sheet, having the negative electrode mixture layers formed on both surfaces, at the outermost layer of the electrode sheet group not only means that the negative electrode mixture layer, which is difficult to contribute to the charging/discharging, is newly formed, but also causes the increase in the capacity of the negative electrode to destroy the balance between the capacity of the positive electrode and the capacity of the negative electrode. In the lithium ion battery, in particular, it is required to balance the capacity of the positive electrode and the capacity of the negative electrode. Therefore, it is difficult to arrange the negative electrode sheet, having the negative electrode mixture layers formed on both surfaces, at the outermost layer of the electrode sheet group from the viewpoint of destroying the capacity balance.

Considering the configuration in which the deposition of the metal lithium upon the pre-dope is prevented and the capacity of the positive electrode and the capacity of the negative electrode are easy to be balanced, the positive electrode sheets 13 and 14, having the positive electrode mixture layer formed one surface thereof, are preferably arranged at the outermost layers of the electrode sheet groups 11, 40, and 50 as illustrated in FIGS. 2, 7, and 8. Not only in case where the lithium ions are pre-doped into the negative electrode sheet, but also in case where the lithium ions are pre-doped into the positive electrode sheet, the potential of the positive electrode during the pre-dope retains voltage higher than 1 V (vs. Li/Li+). Therefore, even if the positive electrode sheet has the positive electrode mixture layer only on its one surface, the deposition of the metal lithium can be prevented.

Figure 9:
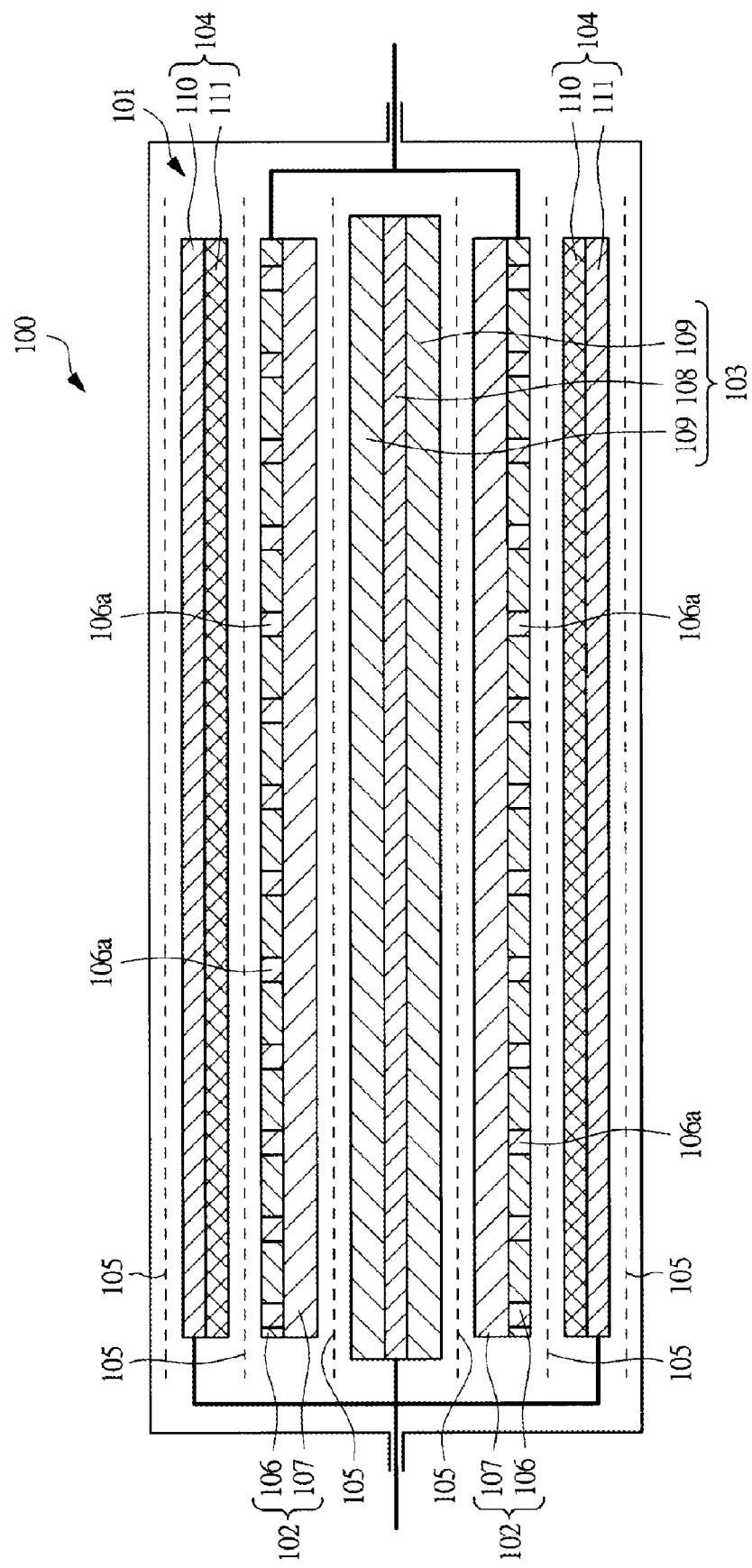
FIG. 9 is a sectional view schematically illustrating a stacked-type electric storage device.

The configuration in which the positive electrode sheet having the positive electrode mixture layer formed on one surface is arranged at the outermost layer of the electrode sheet group is applicable not only to the wound-type electric storage device described above but also to a stacked-type electric storage device. FIG. 9 is a sectional view schematically illustrating a stacked-type electric storage device 100. As illustrated in FIG. 9, an electrode sheet group 101 of an electric storage device 100 is composed of positive electrode sheets 102 and negative electrode sheets 103 that are stacked alternately. A lithium electrode sheet 104 is overlapped on the electrode sheet group 101. Separators 105 are formed between the lithium electrode sheet 104 and the positive electrode 102, and between the positive electrode 102 and the negative electrode 103, respectively. The positive electrode sheet 102 arranged at the outermost layer of the electrode sheet group 101 includes a positive electrode current collector 106 formed with a large number of through-holes 106a, and a positive electrode mixture layer 107 applied on one surface of the positive electrode current collector 106. The negative electrode sheet 103 is formed between the positive electrode sheets 102. The negative electrode sheet 103 includes a negative electrode current collector 108, and negative electrode mixture layers 109 applied on both surfaces of the negative electrode current collector 108. The lithium electrode sheet 104 connected on the negative electrode sheet 103 includes a lithium electrode current collector 110 and a metal lithium foil 111 provided on one surface of the lithium electrode current collector 110. Even in the stacked-type electric storage device 100, when the positive electrode sheet 102 having the positive electrode mixture layer formed on its one surface is arranged at the outermost layer of the electrode sheet group 101, the effect in which the deposition of the metal lithium upon the pre-dope is prevented and the capacity of the positive electrode and the capacity of the negative electrode are easy to be balanced can be achieved.

The components of the aforesaid electric storage device will be explained in detail in the following order: [A] positive electrode sheet, [B] negative electrode sheet, [C] positive electrode current collector and negative electrode current collector, [D] lithium electrode sheet, [E] separator, [F] electrolyte solution, [G] casing.

[A] Positive Electrode Sheet

The positive electrode sheet has the positive electrode current collector and the positive electrode mixture layer coated on the positive electrode current collector. When the electric storage device functions as a lithium ion capacitor, a material that allows lithium ions and/or anions to be reversibly doped and de-doped can be employed as a positive electrode active material contained in the positive electrode mixture layer. Specifically, the positive electrode active material is not particularly limited, so long as it allows at least either of lithium ions or anions to be reversibly doped and de-doped. Examples of the positive electrode active materials include activated carbon, transition metal oxide, conductive polymer, polyacene-based substance, etc.

For example, the activated carbon is preferably made of an activated carbon grain that is subject to an alkali activation treatment and has a specific surface area of not less than 600 $m^2/g$. A phenolic resin, petroleum pitch, petroleum coke, coconut husk, coal-derived coke, etc. are used as the raw material of the activated carbon. Among them, phenolic resin and coal-derived coke, since they can increase the specific surface area. Preferable alkali activators used for the alkali activation treatment of the activated carbons include salts or hydroxides of an alkali metal such as lithium, sodium and potassium. Potassium hydroxide is more preferable. Examples of the methods of the alkali activation include a method in which a carbide and an activator are mixed, and then the resultant is heated in an airflow of inert gas. Further, there is a method in which an activator is carried on a raw material of an activated carbon beforehand, the resultant is heated, and then, a carbonizing process and an activating process are performed. Further, there is a method in which a carbide is activated with a gas activation by using water vapors, and then, the resultant is surface-treated with an alkali activator. The activated carbon to which the alkali activation treatment is performed is pulverized by means of a known pulverizer such as a ball mill or the like. A wide range of the grain size generally used can be applied. For example, it is preferable that D50 is 2 μm or more, more preferably 2 to 50 μm, and most preferably 2 to 20 μm. Further, the activated carbon preferably having an average pore diameter of 10 nm or less and a specific surface area of 600 to 3000 $m^2/g$ is preferable. An activated carbon having a specific surface area of 800 $m^2/g$ or more, particularly 1300 to 2500 $m^2/g$ is more preferable.

When the electric storage device functions as a lithium ion secondary battery, a conductive polymer such as polyaniline or a material that allows lithium ions to be reversibly doped or de-doped can be employed as the positive electrode active material contained in the positive electrode mixture layer. For example, vanadium oxide ($V_2O_5$) or lithium cobalt oxide ($LiCoO_2$) can be used as the positive electrode active material. Examples of the other materials include a lithium-containing metal oxide represented by a chemical formula of $Li_xM_yO_z$ (x, y, z are positive numbers, M is a metal, or can be metals of two or more types), such as $LiCoO_2$, $Li_xNiO_2$, $Li_xMnO_2$ and $Li_xFeO_2$, or a transition metal oxide such as cobalt, manganese, vanadium, titanium and nickel, or a sulfide. In case of requiring a high voltage, a lithium-containing oxide having a potential of 4 V or more with respect to the metal lithium is preferably used. More preferable lithium-containing oxides include a lithium-containing cobalt oxide, lithium-containing nickel oxide, or lithium-containing cobalt-nickel composite oxide.

The positive electrode active material such as the activated carbon described above is formed into a powdery shape, granular shape, short fibrous shape, etc. The positive electrode active material and a binder are dispersed into a solvent, whereby an electrode slurry is formed. The electrode slurry containing the positive electrode active material is coated on the positive electrode current collector and the resultant is dried, whereby the positive electrode mixture layer is formed on the positive electrode current collector. Usable binders mixed with the positive electrode active material include rubber binder such as SBR, fluorine-containing resin such as polytetrafluoroethylene and polyvinylidene fluoride, thermoplastic resin such as polypropylene, polyethylene and polyacrylate. A conductive material such as acetylene black, graphite and metal powder. can appropriately be added to the positive electrode mixture layer.

[B] Negative Electrode Sheet

The negative electrode sheet has the negative electrode current collector and the negative electrode mixture layer coated on the negative electrode current collector. The negative electrode mixture layer contains a negative electrode active material. The negative electrode active material is not particularly limited, so long as it allows ions to be reversibly doped and de-doped. Examples of the material used for the negative electrode active material include silicon, silicon compound, graphite, various carbon materials, polyacene-based material, and tin oxide. The graphite, hard carbon material (non-graphitizable carbon), graphitizable carbon, carbon nano-tube, vapor growth carbon fiber, carbon black, etc. are preferable as the negative electrode active material, since they can increase the capacity. Further, a polyacene-based organic semiconductor (PAS) that is a heat-treated material of an aromatic condensation polymer is preferable for a negative electrode active material, since it can increase the capacity. The PAS has a polyacene skeletal structure. The ratio of a number of hydrogen atoms to a number of carbon atoms (H/C) is preferably within the range between 0.05 and 0.50. When the H/C of the PAS exceeds 0.50, the aromatic polycyclic structure is not sufficiently grown, so that the lithium ions cannot smoothly be doped or de-doped. Therefore, the charging/discharging efficiency of the electric storage device might be reduced. When the H/C of the PAS is less than 0.05, the capacity of the electric storage device might be lowered.

The aforesaid negative electrode active material such as PAS is formed into a powdery shape, a granular shape or short fibrous shape. This negative electrode active material is mixed with a binder to form an electrode slurry. The electrode slurry containing the negative electrode active material is coated on the negative electrode current collector and the resultant is dried, whereby the negative electrode mixture layer is formed on the negative electrode current collector. Usable binders mixed with the negative electrode active material include fluorine-containing resin such as polytetrafluoroethylene, polyvinylidene fluoride, etc., thermoplastic resin such as polypropylene, polyethylene and polyacrylate, rubber binder such as styrene butadiene rubber (SBR). Among these materials, fluorinated binder is more preferable.

Examples of the fluorine-based binder include polyvinylidene fluoride, copolymer of vinylidene fluoride and trifluoroethylene, copolymer of ethylene and tetrafluoroethylene, copolymer of propylene and tetrafluoroethylene, etc. A conductive material such as acetylene black, graphite and metal powder can appropriately be added to the negative electrode mixture layer.

[C] Positive Electrode Current Collector and Negative Electrode Current Collector Various materials generally proposed for a battery or a capacitor can be employed as the material of the positive electrode current collector and the negative electrode current collector. For example, aluminum, stainless steel or the like can be used as the material of the positive electrode current collector. Stainless steel, copper, nickel, etc. can be used as the material of the negative electrode current collector. When through-holes are formed on the positive electrode current collector or the negative electrode current collector, the open-percentage of the through-holes is generally set to 40 to 60. The size, shape and number of the through-hole are not particularly limited, and they may appropriately be set so long as they do not hinder the movement of the lithium ions.

[D] Lithium Electrode Sheet

The lithium electrode sheet includes a lithium electrode current collector and a metal lithium foil applied on the lithium electrode current collector. Instead of the metal lithium foil, other materials such as lithium-aluminum alloy can be used. The metal lithium foil formed by extending the metal lithium by applying pressure is used. However, a metal lithium layer may be formed through the deposition on the lithium electrode current collector. Various materials generally proposed for the positive electrode current collector and the negative electrode current collector can be employed as the material of the lithium electrode current collector.

[E] Separator

A porous member or the like having durability with respect to the electrolyte solution, positive electrode active material, negative electrode active material, or the like, having through-holes and having no electron conductivity can be used for the separator. Generally, paper (cellulose), a cloth made of glass fiber, polyethylene, polypropylene, etc., non-woven fabric, or porous body is used. When the separator is sealed, an adhesive tape or adhesive agent can be used. It is preferable that the adhesive tape or the adhesive agent is also inactive with respect to the electrolyte solution, the positive electrode active material, and the negative electrode active material. The separator can be sealed through the heat-sealing process with the use of the materials described below. Specifically, examples of the materials of the separator include polyethylene, polypropylene, polystyrene, polyethylene terephthalate, polytetrafluoroethylene, polyvinylidene difluoride, polyimide, polyphenylene sulfide, polyamide, poamide imide, polyester, etc. The thickness of the separator can appropriately be set considering the holding amount of the electrolyte solution, strength of the separator, internal resistance of the electric storage device, or the like.

[F] Electrolyte Solution

It is preferable that an aprotic organic solvent containing a lithium salt is used for the electrolyte solution from the viewpoint that an electrolysis does not occur even at a high voltage and lithium ions can stably be present. Examples of the aprotic organic solvent include ethylene carbonate, propylene carbonate, dimethyl carbonate, diethyl carbonate, γ-butyrolactone, acetonitrile, dimethoxyethane, tetrahydrofuran, dioxolane, methylene chloride, sulfolane, etc., wherein these materials are used alone or mixed with one another. Examples of the lithium salt include $LiClO_4$, $LiAsF_6$, $LiBF_4$, $LiPF_6$, LIN(C$_2$F$_5$SO$_2$)$_2$, etc. Further, in order to lower the internal resistance due to the electrolyte solution, the concentration of the electrolyte in the electrolyte solution is preferably set to at least 0.1 mol/L or more. More preferably, it is set within the range of 0.5 to 1.5 mol/L.

Ionic liquid can be employed instead of the organic solvent. The combination of various cations and anions is proposed as the ionic liquid. Examples of the cations include N-methyl-N-propylpiperidinium (PP13), 1-ethyl-3-methyl-imidazolium (EMI), diethyl-methyl-2-methoxyethyl-ammonium (DEME), etc. Examples of the anions include bis(fluorosulfonyl)-imide (FSI), bis(trifluoromethanesulfonyl)-imide (TFSI), PF6-, BF4-, etc.

[G] Casing

Various materials generally used for a battery may be used for the casing. A metal material such as iron and aluminum may be used. A laminate film material having an aluminum layer or a resin layer can also be used. The shape of the casing is not particularly limited. The casing can be formed into a shape appropriately selected according to the purpose, such as cylindrical shape and rectangular shape.

The present invention is not limited to the aforesaid embodiments, and various modifications are possible without departing from the scope of the present invention. In the description above, the lithium electrode sheet is bonded to the negative electrode sheet. However, the lithium electrode sheet is not limited to be bonded to the negative electrode sheet. For example, the lithium electrode sheet is bonded to the positive electrode sheet so as to pre-dope the lithium ions into the positive electrode sheet. The lithium electrode sheet may be bonded to both the negative electrode sheet and the positive electrode sheet upon the pre-dope so as to pre-dope the lithium ions into both the positive electrode sheet and the negative electrode sheet.

What is claimed is:

1. A wound-type electric storage device comprising:
    a stacked electrode sheet group that is formed by stacking a plurality of electrode sheets and accommodated in a casing as wound;
    one of a positive electrode and a negative electrode, including
        a first electrode sheet that is provided at one of outermost layers of the stacked electrode sheet group, and includes a first electrode current collector and a first electrode mixture layer applied onto one surface of the first electrode current collector, and
        a second electrode sheet that is provided at another one of the outermost layers of the stacked electrode sheet group, and includes a second electrode current collector and a second electrode mixture layer applied on one surface of the second electrode current collector; and
    the other one of the positive electrode and the negative electrode, including
        a third electrode sheet that is provided between the first electrode sheet and the second electrode sheet, and includes a third electrode current collector and a third electrode mixture layer applied on both surfaces of the third electrode current collector, wherein
    an ion source sheet, which supplies ions to at least any one of the first electrode mixture layer, the second electrode mixture layer, and the third electrode mixture layer, is overlapped on the stacked electrode sheet group, and the stacked electrode sheet group is wound together with the ion source sheet, in order that one surface of the ion source sheet is faced to the first electrode sheet, while the other surface of the ion source sheet is faced to the second electrode sheet, wherein
    the lengths of the first electrode mixture layer, the second electrode mixture layer, the third electrode mixture layer and the ion source sheet are adjusted such that, when the stacked electrode sheet group and the ion source sheet are wound, the first electrode mixture layer and the second electrode mixture layer are positioned to always face the third electrode mixture layer and that the ion source sheet is positioned to always overlap the first electrode mixture layer, the second electrode mixture layer and the third electrode mixture layer, and
    each of the first electrode sheet and the second electrode sheet is the positive electrode.

2. The wound-type electric storage device according to claim 1, wherein
    the first electrode current collector and the second electrode current collector are formed with a plurality of through-holes.

3. The wound-type electric storage device according to claim 1, wherein
    the third electrode current collector is not formed with through-holes.

4. The wound-type electric storage device according to claim 1, wherein
    the first electrode mixture layer and the second electrode mixture layer are applied at the side of the third electrode sheet.

5. The wound-type electric storage device according to claim 1, wherein
    the ion source sheet includes a lithium electrode current collector connected to at least any one of the electrode current collectors, and metal lithium provided on both surfaces of the lithium electrode current collector.

* * * * *